United States Patent [19]
Saitoh

[11] Patent Number: 4,799,047
[45] Date of Patent: Jan. 17, 1989

[54] LIQUID LEVEL DETECTING AND INDICATING SYSTEM WITH COIL TYPE MEASURING DEVICE

[75] Inventor: Mitsuhiro Saitoh, Oobu, Japan

[73] Assignees: Nippondenso Co., Ltd., Kariya; Toyota Jidosha Kabushiki Kaisha, Toyota, both of Japan

[21] Appl. No.: 130,326

[22] Filed: Dec. 8, 1987

[30] Foreign Application Priority Data

Dec. 17, 1986 [JP] Japan .................. 61-300726

[51] Int. Cl.$^4$ ............................................. G08B 21/00
[52] U.S. Cl. ....................................... 340/618; 340/59; 73/304 R
[58] Field of Search ......... 180/284; 73/290 R, 304 R; 340/52 R, 52 D, 59, 527, 529, 618, 620; 324/61 R; 364/431.1, 431.11, 432, 442, 509

[56] References Cited

U.S. PATENT DOCUMENTS

| | | | |
|---|---|---|---|
| 3,939,470 | 2/1976 | Arai et al. | 340/59 |
| 4,326,413 | 4/1982 | Takeshita et al. | 73/313 |
| 4,437,162 | 3/1984 | Kato | 340/618 |
| 4,502,124 | 2/1985 | Grohmann et al. | 364/442 |
| 4,506,258 | 3/1985 | Charboneau et al. | 340/618 |
| 4,545,020 | 10/1985 | Brasfield | 340/618 |
| 4,591,839 | 5/1986 | Charboneau et al. | 73/304 R |
| 4,611,287 | 9/1986 | Kobayashi et al. | 364/442 |
| 4,731,730 | 3/1988 | Hedrick et al. | 340/59 |

FOREIGN PATENT DOCUMENTS 55-17485 2/1980 Japan .
58-42947 9/1983 Japan .
59-37699 10/1984 Japan .
60-95303 5/1985 Japan .
60-128042 7/1985 Japan .
61-202169 9/1986 Japan .

*Primary Examiner*—Joseph A. Orsino
*Assistant Examiner*—Jill D. Jackson
*Attorney, Agent, or Firm*—Cushman, Darby & Cushman

[57] ABSTRACT

A liquid level detecting and indicating system for detecting a liquid level of a measured object such as fuel on the basis of a resistance changed in accordance with level variation of the measured object and indicating the liquid level in response to a magnetic field produced to correspond to the resistance. The system comprises a gauging circuit coupled through a switch to a battery and including a bridge circuit comprising at least a variable resistor and two groups of coils, the variable resistor being arranged such that its resistance is changed in accordance with the level variation of the measured object. Also included in the system is a disturbance detecting circuit coupled to one end of the variable resistor of the gauging circuit for comparing the voltage thereof with a reference to detect a abrupt variation of the voltage at the one end of the variable resistor and generating a control signal in accordance with the result of the detection. In response to the control signal therefrom, a potential control circuit controls the magnitude of the voltage at the end of the variable resistor in order to remove the abrupt variation of the voltage thereat, thus preventing level pointer from swinging severely due to vibration of the measured object.

6 Claims, 3 Drawing Sheets

FIG 1B
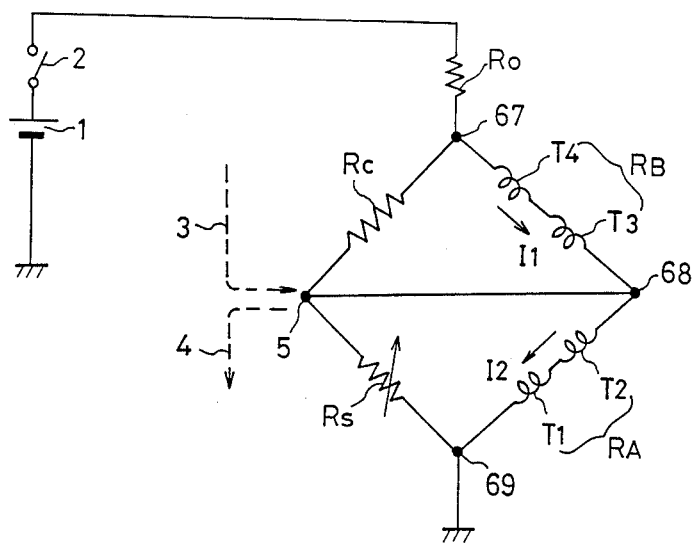
FIG. 2　　FIG. 3　　FIG. 4　　FIG. 5
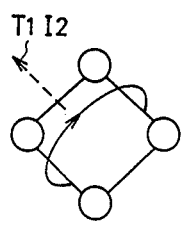 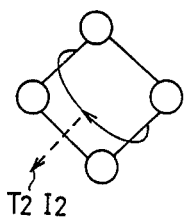 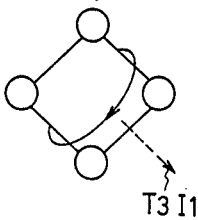 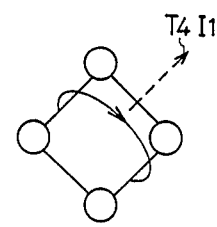
FIG. 6
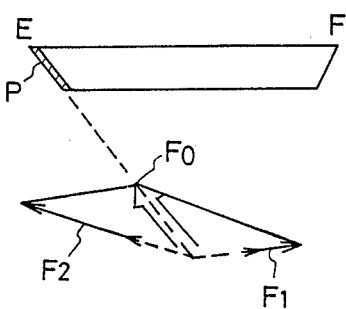

LIQUID LEVEL DETECTING AND INDICATING SYSTEM WITH COIL TYPE MEASURING DEVICE

BACKGROUND OF THE INVENTION

The present invention relates generally to liquid level detecting and indicating systems, and more particularly to a liquid level detector with a resistor whose resistance is changed in accordance with liquid level variation. This invention is applicable particularly, but not exclusively, to fuel level indicators of motor vehicles.

Various types of indicating systems have been devised heretofore to detect and indicate the level of a liquid within a receptacle and, of these systems, a resistance-changing type liquid level indicator as is known in the art is so constructed that detection of the liquid level is made on the basis of the resistance change of a resistor depending upon liquid level variation. An important problem in such a type of liquid level indicator is that a pointer is severely vibrated in response to rapid variation of the liquid level and difficulty is encountered to accurately recognize the liquid level. Generally, a motor vehicle is subject to inclination or vibration due to rough road surfaces and hence the fuel level within the fuel tank is violently varied in response to, the inclination or vibration. This may cause an inaccurate indication of the fuel level, resulting in a disadvantage to the vehicle driver. One known arrangement for solution of this problem is that a delay circuit is provided between a liquid level detecting section and an indicating section of the liquid level indicating system and its delayed amount is varied in accordance with the magnitude of the liquid level vibration for prevention of the pointer vibration due to the liquid level vibration, as exemplified in description in Japanese Utility Model Publication No. 59-37699. However, since this arrangement is basically made with the delay circuit being provided between a liquid level sensor and a fuel gauge, one problem arises in that the delay of fuel indication is always performed and this makes difficult quick indication of the fuel level. To avoid this problem associated with the provision of the delay circuit, a bypass device may be required to directly couple the liquid level sensor to the fuel gauge so that a detection signal from the liquid level sensor does not pass through the delay circuit, resulting in a complex construction.

SUMMARY OF THE INVENTION

The present invention has been developed in order to remove the above-mentioned disadvantages inherent to the prior liquid level indicating systems.

It is therefore an object of the present invention to provide a new and improved liquid level detecting and indicating system which allows a quick indication of the liquid level and which is capable of preventing a level pointer from swinging severely due to vibration of the liquid level without using a delay circuit between a liquid level sensor and a fuel level indicator.

A liquid level detecting and indicating system according to the present invention has a coil type gauging circuit including a bridge circuit comprising at least a variable resistor whose resistance is changed in accordance with level variation of a measured liquid and two groups of coils arranged such that a level pointer is magnetically moved in accordance with a distribution condition of currents flowing therethrough which is determined on the basis of the resistance of the variable resistor. Also included in the system is a potential follow-up circuit having a capacitor which is charged with first and second time constants so that the voltage thereof becomes equal to the voltage at one end of the variable resistor. Time is measured after turning-on of a switch of a power supply, and the capacitor is rapidly charged with the first time constant before elapse of a predetermined time period from the turning-on of the power supply switch and slowly charged with the second time constant after elapse of the predetermined time period therefrom. A disturbance detecting circuit performs comparison between the voltages at the one end of the variable resistor and at one end of the capacitor in order to detect abrupt variation of the voltage at the one end of the variable resistor. The disturbance detecting circuit generates a control signal in accordance with the result of the comparison. The control signal therefrom is coupled to a potential control circuit which in turn controls the magnitude of the voltage at the one end of the variable resistor so that the distribution state of the currents passing through the two groups of coils is changed to prevent a level pointer from swinging severely due to the liquid vibration.

The indication of the liquid level can be quickly made in response to no generation of the control signal from the disturbance detecting circuit, i.e., at the time of no vibration of the measured liquid. On the other hand, the capacitor of the potential follow-up circuit is charged slowly after the predetermined time period so that the voltage of the capacitor becomes slowly equal to the voltage at the one end of the variable resistor irrespective of abrupt and great variation of the voltage thereat. This allows to accurately determine the presence or absence of a disturbance, i.e., abrupt and great vibration of the liquid level due to vibration or inclination of the liquid container, by comparing the voltage of the capacitor with the voltage at the one end of the variable resistor. That is, when the voltage thereat is greatly varied with respect to the voltage of the capacitor, the great variation of the voltage thereat results from a disturbance. In response to generation of the disturbance, the disturbance detecting circuit generates the control signal to be supplied to the potential control circuit whereby the voltage at the one end of the variable resistor is controlled in order to prevention of great swinging of the level pointer against the disturbance. The operation of the potential control circuit is limited to the case of generation of a disturbance, resulting in small power consumption.

BRIEF DESCRIPTION OF THE DRAWINGS

The object and features of the present invention will become more readily apparent from the following detailed description of the preferred embodiment taken in conjunction with the accompanying drawings in which:

FIG. 1B is a detailed illustration of a bridge circuit of the liquid, level detecting and indicating system of FIG. 1A;

FIGS. 2 to 5 are illustrations useful for describing the directions of magnetic fields developed due to coils of the bridge circuit of FIG. 1B;

FIGS. 6 to 8 are illustrations useful for describing the movement of a liquid level pointer due to distributions of currents passing through the coils of the bridge circuit of FIG. 1B.

DETAILED DESCRIPTION OF THE INVENTION

Figure 1A:
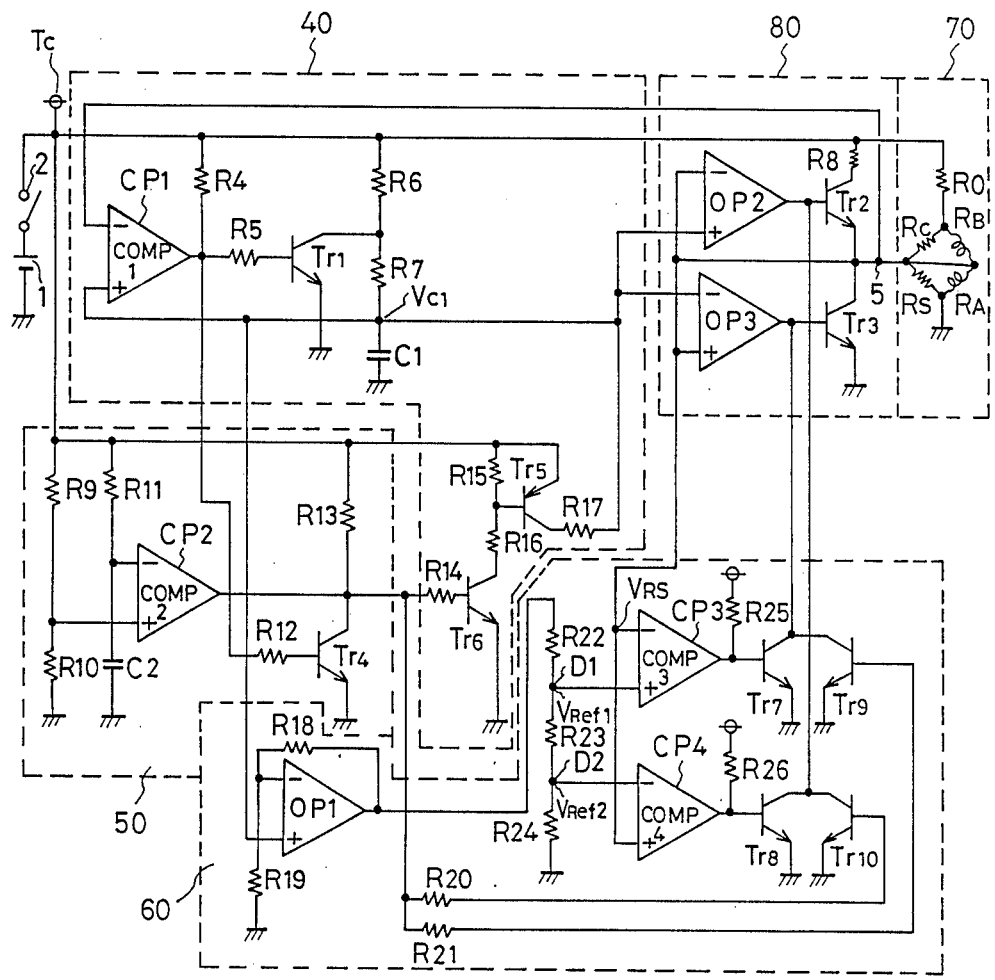
FIG. 1A is an wiring diagram showing a liquid level detecting and indicating system according to an embodiment of the present invention.

Referring now to FIG. 1A, there is illustrated a circuit arrangement of a liquid level detecting and indicating apparatus according to an embodiment of the present invention. The liquid level detecting and indicating apparatus is employed as a fuel indicator of a motor vehicle and hence powered by a battery 1 through a key switch 2 of the motor vehicle. The apparatus comprises a coil type gauging circuit section illustrated at 70 which, as shown in detail in FIG. 1B, includes a bridge circuit made up of a resistor $R_A$ comprising two coils T1 and T2, a resistor $R_B$ comprising two coils T3 and T4, a fixed resistor $R_C$ and a variable resistor $R_S$. When a voltage is applied from the battery 1 through a fixed resistor R0 to a node 67 between the resistor $R_B$ and the fixed resistor $R_C$, a current I1 passes through the two coils T3 and T4 and a current I2 flows through another two coils T1 and T2. A node between variable resistor $R_S$ and the resistor $R_A$ is coupled to another polarity of the battery 1. The variable resistor $R_S$ is arranged to be operated in connection with a float within a fuel tank of the motor vehicle so that its resistance is changed in accordance with variation of the level of the fuel therewithin, thus to changing the values of the currents I1 and I2.

Figure 7:
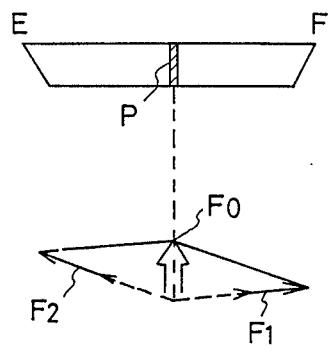
Figure 8:
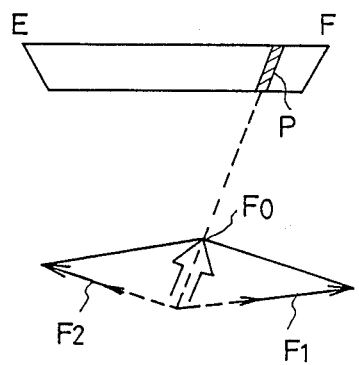

FIGS. 2 through 5 are illustrations useful for describing the magnetic fields generated due to the currents I1 and I2. The magnetic field generated by the coil T1 and the current I2 flowing therethrough is directed as indicated by an arrow T1I2 in FIG. 2, the magnetic field produced due to the coil T2 and the current I2 therethrough is directed as indicated by an arrow T2I2 in FIG. 3, the direction of the magnetic field generated by the coil T3 and the current I1 is taken as indicated by an arrow T3I1 in FIG. 4, and the magnetic field due to the coil T4 and the current I1 follows the direction indicated by an arrow T4I1 in FIG. 5. As obvious from FIGS. 2 to 5, the magnetic fields are respectively generated in the different directions, and the combined, or resultant, magnetic field drives a magnet connected to a pointer of a fuel indicator which is in turn rotated so that the pointer points to the direction of the resultant magnetic field. This is illustrated in FIGS. 6 to 8 for a better understanding, wherein reference F1 represents the magnetic field generated due to the coils T3 and T4 and the current I1 flowing therethrough and F2 designates the magnetic field produced by the coils T1 and T2 and the current I2 therethrough. That is, FIG. 6 illustrates the state that the fuel within the fuel tank is substantially empty. Here, the resistance Rs of the resistor $R_S$ is set to the maximum value and therefore the current I2 becomes larger which in turn enhances the magnetic field F2 so that the resultant magnetic field F0 is directed to cause the pointer P of the fuel gauge to point the leftmost position of a panel of the fuel gauge. On the other hand, when the fuel remains to the some degree in the fuel tank, the resistance Rs of the resistor $R_S$ becomes reduced by the corresponding value and, as shown in FIG. 7, the currents I1 and I2 becomes coincident substantially with each other so that the pointer P points to the middle position of the gauge panel. FIG. 8 illustrates the case that the quantity of the fuel within the fuel tank is more increased as compared with in FIG. 7, the description of which will be omitted because of easy understanding. From the above, it will be understood that it is possible to move the pointer to the fuel-reduced direction by increasing the current I2 with respect to the current I1 and to move it to the fuel-increased direction by increasing the current I1 with respect to the current I2. That is, the resultant magnetic field of the bridge is controllable by controlling the distribution state between the currents I1 and I2. The bridge circuit, as shown in FIG. 1B, is arranged such that the node (junction) 5 between the fixed resistor $R_C$ and the variable resistor $R_S$ is coupled to the node (junction) 68 between the resistor $R_A$ and the resistor RB and therefore the current I2 can be increased with respect to the current I1 in response to entering of a current through the node 5 and the current I1 can be also increased with respect to the current I2 in response to leaving of a current therethrough. More specifically, in FIG. 1B, when a current enters the node 5 from an external circuit as shown by an arrow 3, the current I2 flowing through the coils T1 and T2 increases with respect to the current I1, and when a current flows out of the node 5 into the external circuit as indicated by an arrow 5, the current I2 decreases with respect thereto because a portion of the current passed through the resistor $R_B$ flows out of the node 5 to the external circuit. Here, the entering and leaving of the current may be achieved by means of control of the potential at the node 5. In this embodiment, when the fuel level within the fuel tank is not rapidly varied because of no vibration or the like of the motor vehicle, for example, immediately after turning-on of the key switch 2 of the motor vehicle by the vehicle driver, the currents I1 and I2 may be determined in accordance with only the variation of the resistance Rs of the resistor $R_S$ without application of a voltage from the external circuit to the junction 5 in order to quickly indicate the amount of the fuel within the fuel tank. On the other hand, after the elapse of a predetermined time period from the turning-on of the key switch 2, the severe vibration of the pointer P of the fuel gauge is expected due to the variation of the fuel level on running and, to avoid this problem, the entering or leaving of a current into or from the node 5 is performed in response to rapid variation of the fuel level over a predetermined magnitude in order to prevent the severe vibration of the pointer P and make easy the confirmation of the fuel level for the vehicle driver. The rapid variation of the fuel level may be detected by variation of the resistance Rs of the resistor $R_S$.

Returning back to FIG. 1A, a more detailed description of this embodiment will be described hereinbelow. In FIG. 1A, also included in the liquid level detecting and indicating apparatus is a potential control circuit section 80 coupled to the coil type gauging circuit section 70. The potential control circuit section 80 is arranged so as to compulsorily perform the growth and decay of the potential at the node 5 and thus comprises a transistor Tr2 for supply a current to the node 5 from an external section and a transistor Tr3 for drawing a current therefrom. The potential control circuit section 80 is coupled to a potential followup circuit section 40 which has a capacitor C1 and follows with delay so that the potential at the node 5 of the coil type gauging circuit section 70 becomes equal to the potential Vc1 at one end of the capacitor C1. To the potential followup circuit section 40 is coupled a timer circuit section 50 for counting a time after the turning-on of the key switch 2 and generating a signal to the potential followup circuit section 40 in response to elapse of a predetermined time period so as to switch the time constant for the delay operation of the potential followup circuit section 40. Further included in this embodiment is a disturbance detecting circuit section 60 which performs the comparison between a voltage at the node 5 and a voltage based on the potential Vc1 at the one end of the capacitor C1 in order to detect the abrupt variation of the resistance Rs of the resistor $R_S$. The disturbance detecting circuit section 60 controls the potential at the node 5 by supplying a signal to the potential control circuit section 80 in accordance with variation of the resistance Rs thereof.

In basic operation of this liquid level detecting and indicating apparatus, In response to turning-on of the key switch 2, a power from the battery 1 is applied to the coil type gauging circuit section 70 which in turn generates the currents I1 and I2 corresponding to the present fuel level, i.e., the resistance Rs of the resistor $R_S$, and moves the pointer P up to the corresponding position. At this time, the transistors Tr2 and Tr3 are respectively in the OFF-state so as not to force the potential control circuit section 80 to control the potential at the node 5 of the coil type gauging circuit section 70, resulting in a quick indication of the amount of the fuel within the fuel tank. On the other hand, a capacitor C2 of the timer circuit section 50 is charged while the coil type gauging circuit section 70 is performing the quick indication of the fuel level. Here, transistors Tr5 and Tr6 of the potential followup circuit section 40 are turned on until the capacitor is charged completely, so that the capacitor C1 is rapidly charged by means of a quick charging circuit comprising the transistor Tr5 and a resistor R17 whereby the capacitor C1 is quickly charged to be equal to the potential at the node 5. A comparator CP1 and a transistor Tr1 are provided in the potential followup circuit section 40 to detect the potential at the node 5 and cause the the voltage Vc1 of the capacitor C1 to become equal to the voltage of the node 5. After elapse of a predetermined time period from the turning-on of the key switch 2, the capacitor C2 of the timer circuit section 50 is sufficiently charged and the transistors Tr6 and Tr5 are turned off to stop the rapid charging of the capacitor C1 so that the capacitor C1 is slowly charged through resistors R6 and a7. That is, even if the resistance Rs of the resistor $R_S$ is abruptly changed due to disturbance such as vehicle vibration and fuel level variation thus to cause a rapid variation of the potential at the node 5 of the coil type gauging circuit section 70, the charging of the capacitor is performed slowly without rapidly following the potential variation of the node 5. The voltage Vc1 of the capacitor C1 is introduced into the disturbance detecting circuit section 60 wherein two reference voltages are set on the basis of the voltage Vc1 and the potential at the node 5 is compared with the two reference voltages in comparators CP3 and CP4 and transistors Tr7 and Tr8 are respectively controlled in accordance with the results of the comparisons. As a result, the transistors Tr2 and Tr3 coupled thereto are controlled so as to compulsorily control the potential at the node 5 to prevent the rapid variation of the potential thereat due to disturbance, thereby preventing the abrupt swinging of the pointer P of the fuel gauge.

A further description will be made in accordance with the circuit arrangement of FIG. 1A. In response to turning-on of the key switch 2, current due to the battery 1 flows through a resistor R11 to the capacitor C2 which is in turn charged with a time constant of C2×R11. Until the voltage of the capacitor C2 reaches Vcc×R10/(R9 30 R10) where Vcc is the voltage of a terminal Tc which is supplied to an unshown a voltage stabilizer and R10 and R9 respectively represent the resistance values of resistors R10 and R9, the output of the comparator CP2 is of the high level and a current is supplied through a resistor R14 to the base of the transistor Tr6 to turn on the transistor Tr6. With the turning-on of the transistor Tr6, a current is supplied through the transistor Tr6 and a resistor R16 to the base of the transistor Tr5 to similarly turn on the transistor Tr5. Therefore, the capacitor C1 of the potential followup circuit section 40 is coupled through the transistor Tr5 and resistor R17 to the battery 1 so as to be quickly charged with a time constant of C1×R17 up to a voltage equal to that of the node 5. The output of the comparator CP1 of the potential followup circuit section 40 is of low level during the charging of the capacitor C1. That is, since the inverting input terminal of the comparator CP1 is coupled to the node 5 and the non-inverting input terminal thereof is coupled to the one end of the capacitor C1, the level of the output of the comparator Cp1 becomes low when the potential at the node 5 is higher than the voltage Vc1 of the capacitor C1. Thus, a transistor Tr4 of the timer circuit section 50 is turned off whereby currents are supplied through resistors R13, R20 and R21 to the bases of transistors Tr9 and Tr10 which are turned on, respectively. The turning-on of the transistors Tr9 and Tr10 cause turning-off of the transistors Tr2 and Tr3, thereby inhibiting the compulsive control of the potential at the node 5 so that the coil type gauging circuit section 70 per se independently operates to quickly indicate the fuel level within the fuel tank.

Thereafter, at the time that the voltage Vc1 of the capacitor C1 has become equal to the potential at the node 5, the output level of the comparator CP1 becomes high. Therefore, a base current is supplied through the resistor R5 to the transistor Tr1 which is then turned on. In addition, a base current is supplied from the comparator CP1 through a resistor R12 to the transistor Tr4, which is also turned on. The turning-on of the transistor Tr4 causes turning-off of the transistor Tr6, the base of which is coupled thereto, and further the turning-off of the transistor Tr6 leads to turning-off of the transistor tr5, which stops the rapid charging of the capacitor C1 made through the transistor Tr5 and the resistor R17. At the same time, the turning-on of the transistor Tr1 prevents the capacitor C1 from being charged through the resistor R6. More specifically, when the comparator CP1 detects the time that the voltage Vc1 of the capacitor C1 has become equal to that of the node 5, the charging path of the capacitor C1 is cut off by turning-on of the transistors Tr1 and Tr4 and the charging of the capacitor C1 is stopped at the time whereby the voltage Vc1 of the capacitor C1 follows the potential at the node 5 with a predetermined delay. When the potential at the node 5 is decreased, the transistor Tr1 is turned on by the output of the comparator CP1 and the capacitor C1 is discharged through the resistor R7 and the transistor Tr1 so that the voltage Vc1 becomes equal to that of the node 5.

After a predetermined time period is elapsed with respect to the turning-on of the key switch 2, the voltage of the capacitor C2 is increased and the output of the comparator CP2 is switched from the high level to the low level. As a result, the transistors Tr6 and Tr7 are turned off so that the rapid charging of the capacitor C1 through the resistor R17 is stopped and the slow charging thereof is performed by a current passing through the resistors R6 and R7 and the voltage thereof follows the voltage of the node 5. The voltage Vc1 of the capacitor C1 is coupled to the non-inverting input terminal of an operational amplifier OP1 of the disturbance detecting circuit section 60 to be amplified. The amplified voltage is divided by resistors R22 and R23, thus obtaining two reference voltages Vref1 and Vref2 at points D1 and D2. Here, the two reference voltages Vref1 and Vref2 are expressed as follows:

$$Vref1 = Vc1 \times \{1 + (R18/R19) \times (R23 + R24)/(R22 + R23 + R24)\}$$

$$Vref2 = Vc1 \times \{(1 + (R18/R19)) \times (R24/(R22 + R23 + R24))\}.$$

Now, assuming that the voltage of the capacitor C1 is higher than that of the node 5 and the comparator CP1 generates a high-level signal to turn on the transistors Tr1 and Tr4, the transistor Tr9 and Tr10 are turned off in response to the turning-on of the transistor Tr4 and the transistors Tr2 and Tr3 for controlling the potential at the node 5 are operated depending upon the ON-OFF operation of the transistors T7 and T8.

In the vehicle running mode, under the condition that vibration of the vehicle does not occur because of running on a flat road surface, the resistors r18, R19, R22, R23 and R24 are set so that the voltage Vc1 of the capacitor C1 assumes Vref1 < Vc1 21 Vref2. That is, the voltage value of the capacitor C1 is determined between the reference voltage Vref1 at the point D1 and the reference voltage Vref2 at the point D2. As a result, the outputs of the comparators CP3 and CP4 becomes in the high level state to turn on the transistors Tr7 and Tr8 whereby the transistors Tr2 and Tr3 are respectively turned off, resulting in no control of the potential at the node 5 and independent operation of the coil type sensing circuit section 70. On the other hand, under the condition that the potential at the node 5 is greatly varied in response to great variation of the voltage across the resistor $R_S$ due to the running of the vehicle on a rough road surface, when the voltage VRs at the inverting input terminal of the comparator CP3 and the voltage VRs at the non-inverting input terminal of the comparator CP4 exceed the reference voltage Vref1, the output of the comparator CP3 is switched from the high level state to the low level state and the output of the comparator CP4 remains in the high level state. Therefore, the transistor Tr7 is turned off and the transistor Tr8 is kept in the on-state. The turning-off of the transistor tr7 causes turning-on of the transistor Tr3 and the turning-on of the transistor Tr8 leads to turning-off of the transistor Tr2. As a result, the potential at the node 5 is compulsorily decreased due to the turning-on of the transistor tr3 so that a current flows out of the node 5 until the the voltage VRs becomes equal to the voltage Vc1 of the capacitor C1. Thus, the current I2 is decreased to prevent the pointer P of the fuel gauge from swinging greatly in the left direction in FIG. 6. In other words, when the fuel level is abruptly reduced on running of the vehicle, the resistance Rs of the resistor $R_S$ is abruptly increased and the voltage VRs becomes higher to exceed the reference voltage Vref1. At this time, although the pointer P tends to abruptly move in the left direction in FIG. 6, as described above, the transistor Tr3 is turned on to decrease the potential at the node 5, that is, a current flows from the node 5 through the transistor Tr3, an therefore the current I2 is decreased so as to prevent the pointer P from greatly swinging in the left direction in FIG. 6.

In contrast with the above, when the fuel level becomes higher because of the running of the vehicle on the rough road surface and the resistance Rs is decreased so that the voltage VRs becomes below the reference voltage Vref2, the output of the comparator CP3 assumes the high level and the output of the comparator CP4 assumes the low level whereby the transistor Tr7 is turned on to turn off the transistor Tr8, thereby turning on the transistor Tr2 and turning off the transistor Tr3. Therefore, a current is supplied through the transistor Tr2 and the resistor R8 to the junction 5 as shown by the arrow 3 in FIG. 1B and hence the current I2 is increased so as to prevent the pointer P from abruptly swinging in the right direction in FIG. 6. That is, the transistor Tr2 provides a current so that the voltage VRs becomes equal to the voltage Vc1 of the capacitor c1, resulting in prevention of the abrupt swinging of the pointer P. The transistors Tr2 and Tr3 are turned only in the case of prevention of the great swinging, resulting in reduction of the power consumption.

Figure 9:
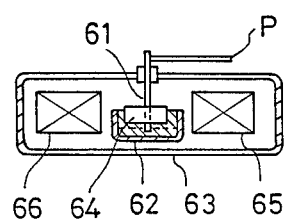
FIG. 9 schematically shows one of example of arrangement of a liquid gauge.

A description will be hereinbelow made in terms of the fuel gauge in the above-mentioned embodiment of the present invention with reference to FIG. 9. The fuel gauge is basically arranged to comprise a stator with four coils and a rotor, i.e., disc-shaped magnet, the rotating shaft of which is connected to a pointer indicating the fuel level within the fuel tank of a motor vehicle. More specifically, as illustrated in FIG. 9, the pointer P is coupled through a rotating shaft 61 to a disc-shaped magnet 62 which is rotatably provided in a case 63 of silicon oil 64, for example. The disc-shaped magnet 62 is magnetically coupled to coils 65 and 66 corresponding to the coils T1 through T4 of the coil type gauging circuit section 70 of FIG. 1A or 1B so that the pointer P is magnetically controlled to indicate the fuel level in response to variation of the resistance Rs of the resistor $R_S$ of the gauging circuit section 70.

It should be understood that the foregoing relates to only a preferred embodiment of the present invention, and that it is intended to cover all changes and modifications of the embodiment of the invention herein used for the purposes of the disclosure, which do not constitute departures from the spirit and scope of the invention. For example, although in the fuel gauge the rotor 62 is immersed in the silicon oil to remove vibration of the pointer P by its viscosity, it is also appropriate to eliminate the vibration of the pointer using air resistance due to the rotation of the rotating shaft. In the above-description, this embodiment is described to be used for detecting and indicating a liquid level. However, the present invention is not limited to the detection and indication of fuel level of a motor vehicle, but applicable for other mechanically measuring devices.

What is claimed is:

1. A level detecting and indicating system for detecting a level of a measured object on the basis of a resistance changed in accordance with variation of the position of said measured object and indicating the level in response to a magnetic field produced to correspond to the resistance, comprising:
  power supply means with switching means for supplying an electric power and stopping the power supply;

gauging circuit means coupled through said switching means to said power supply means and including a bridge circuit comprising at least variable resistor means and coil means, said variable resistor means being arranged such that its resistance is changed in accordance with the variation of the position of said measured object;

potential followup circuit means for detecting the voltage at one end of said variable resistor of said gauging circuit means, said potential followup circuit means including a capacitor which is coupled through said switching means to said power supply means and charged with first and second time constants so that its voltage becomes equal to the detected voltage at the one end of said variable resistor means, said first and second time constants being switched from each other in response to first and second charging signals;

timer circuit means including time measuring means for measuring a time period elapsed from a turning-on of said switching means, said timer circuit means generating said first charging signal to said potential followup circuit means before elapse of a predetermined time period from the turning-on of said switching means so that said capacitor is charged rapidly with said first time constant and generating said second charging signal thereto after the elapse of said predetermined time period so that it is charged slowly with second time constant;

disturbance detecting circuit means coupled to one end of said capacitor of said potential followup circuit means and the one end of said variable resistor means of said gauging circuit means for comparing the voltages thereof with each other to detect a abrupt variation of the voltage at the one end of said variable resistor means and generating a control signal in accordance with the result of the detection; and potential control circuit means coupled to said disturbance detecting circuit means for controlling magnitude of the voltage at the end of said variable resistor means in response to said control signal from said disturbance detecting circuit to remove the abrupt variation of the voltage thereat.

2. A level detecting and indicating system as claimed in claim 1, wherein said measured object is a fuel within a fuel tank of a motor vehicle.

3. A level detecting and indicating system as claimed in claim 1, wherein said bridge circuit of said gauging circuit means comprises said variable resistor means, resistor means, first coil means and second coil means which are connected in series, a first junction between said resistor means and said first coil means being coupled to one polarity of said power supply means and a second junction between said variable resistor means and said second coil means being coupled to the other polarity of said power supply means, a third junction between said variable resistor means and said resistor means having coupled to the one end of said variable resistor means and coupled to a fourth junction between said first and second coil means.

4. A level detecting and indicating system as claimed in claim 3, wherein said potential control circuit means is coupled to said third and fourth junctions for preventing the voltage thereat from being greatly varied.

5. A level detecting and indicating system as claimed in claim 1, wherein said disturbance detecting circuit means includes means for developing first and second reference voltages by amplifying and dividing the voltage of said capacitor of said potential followup circuit means, said disturbance detecting circuit means determining no abrupt variation of the voltage at the one end of said variable resistor means when the voltage at the one end of said variable resistor means is kept between said first and second reference voltages and generating said control signal when it is out of the range between said first and second reference voltages.

6. A level detecting and indicating system as claimed in claim 1, wherein said potential control circuit means includes first and second transistors used for controlling the voltage at the one end of said variable resistor means, said first transistor being provided between one polarity of said power supply means and the one end of said variable resistor means and second transistor being provided between the other polarity of said power supply means and the one end of said variable resistor means, one of said first and second transistors being operated in response to said control signal from said disturbance detecting circuit means so that a current enters or leaves the one end of said variable resistor means.

* * * * *